United States Patent [19]
Pires

[11] Patent Number: 5,570,131
[45] Date of Patent: Oct. 29, 1996

[54] PSEUDO-DIGITAL COMPRESSION OF VIDEO SIGNALS

[76] Inventor: H. George Pires, 47H Valley Rd., Hampton, N.J. 08827

[21] Appl. No.: 328,672

[22] Filed: Oct. 25, 1994

[51] Int. Cl.⁶ ............................................. H04N 7/26
[52] U.S. Cl. .......................................... 348/386; 348/387
[58] Field of Search .................................. 348/385–388, 348/473, 476, 488; H04N 7/18, 7/24, 7/26

[56] References Cited

U.S. PATENT DOCUMENTS

| | | | |
|---|---|---|---|
| 4,646,135 | 2/1987 | Eichelberger et al. | 358/12 |
| 4,646,149 | 2/1987 | Wojnarowski et al. | 348/386 |
| 4,704,629 | 11/1987 | Vreeswijk et al. | 348/386 |
| 4,807,030 | 2/1989 | Sacks | 348/386 |
| 5,231,494 | 7/1993 | Wachob | 348/385 |

FOREIGN PATENT DOCUMENTS 6473214  10/1990  Japan ................................. 348/473

*Primary Examiner*—Victor R. Kostak
*Attorney, Agent, or Firm*—Rohm & Monsanto

[57] ABSTRACT

A system for transmitting multiple video signals via a single video channel, each video signal having a luminance component in respective sequential horizontal line periods. Luminance components of the video signals are separated and compressed. An output video signal having sequential output horizontal line periods is formed and the compressed luminance components are inserted in the output horizontal line periods. Chroma components are compressed by a higher compression factor and inserted in the blanking intervals. The two color video signals are compressed into one standard 4.2 MHz channel, permitting the system to replace directly any existing 6 MHz audio/video transmission system. An encoder aspect of the invention combines plural video source channels to form an output video channel for transmission, using first and second decoders for separating the input video signal into respective luminance and chroma signals. A compressor compresses the luminance and chroma signals, and a multiplexer selects alternately between the decoders. A decoder system extracts the video channels from the encoded video signal. An analog-to-digital converter issues luminance digital data corresponding to a luminance component of the encoded video signal. A luminance expander expands the luminance digital data, and a demultiplexer alternately produces portions of the time-expanded luminance digital data corresponding to respective ones of the video channels. Sync information is regenerated at the decoders from the vertical sync pulses which are left intact in the transmitted signal. Interpolated chroma information is provided to reconstructed video channels.

25 Claims, 10 Drawing Sheets

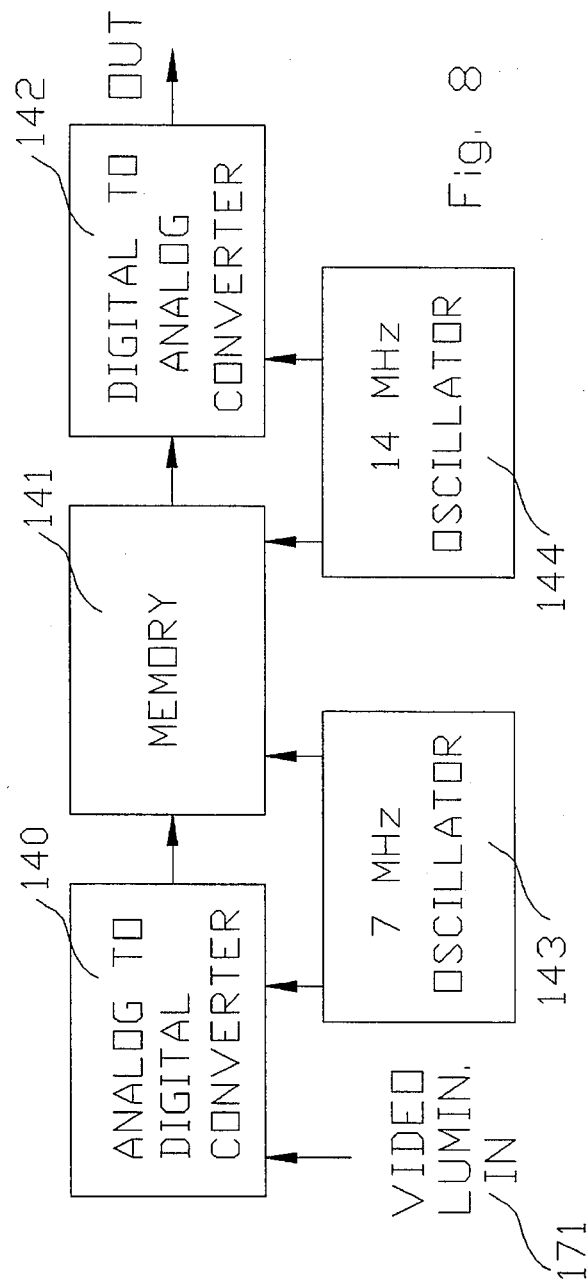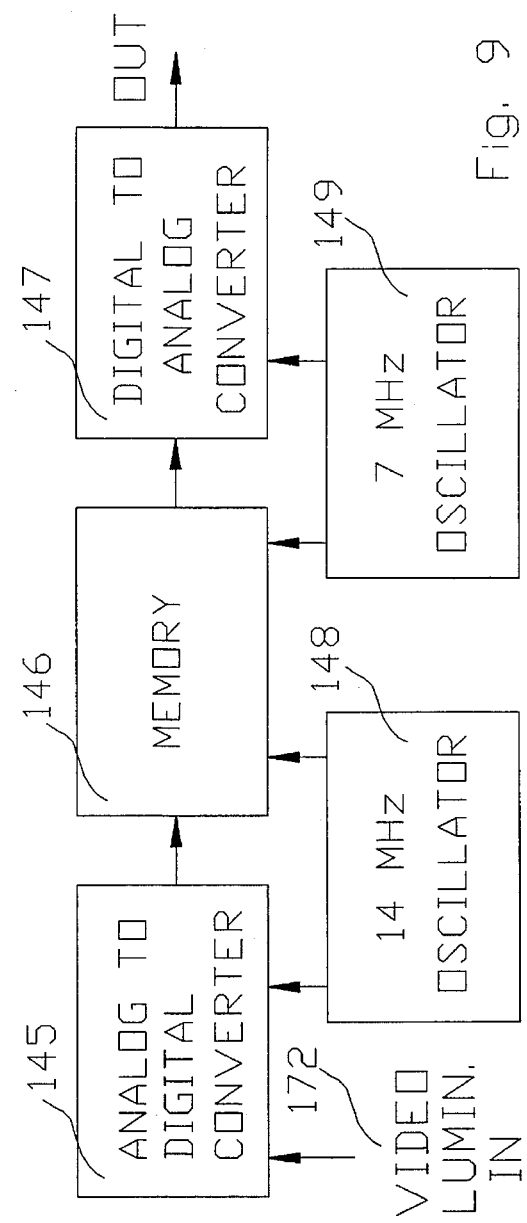

PSEUDO-DIGITAL COMPRESSION OF VIDEO SIGNALS

BACKGROUND OF THE INVENTION

1. Field of the Invention

This invention relates generally to methods and systems for expanding the amount of video information which is be transmitted within a given bandwidth, and more particularly, to a system whereby two video channels are compressed and transmitted within a standard video channel.

2. Description of the Related Art

There are numerous applications in video transmission systems where it would be advantageous to transmit multiple programs on channels presently designated for a single program. Many attempts are currently being made using digital techniques to achieve this objective. Digital techniques are, however, very expensive at both, the transmitting and receiving ends. In addition, the application of known digital techniques results in the introduction of objectionable artifacts and a degradation of picture quality.

There is, therefore, a need for a video transmission arrangement wherein a plurality of video programs are compressed into a single video channel, without significant degradation of the video picture. In addition, it is highly desirable that the multi-program single channel have the capacity to be scrambled to ensure that the video information can be accessed only by authorized viewers.

It is, therefore, an object of this invention to provide a system for transmitting two video programs in one video channel.

It is another object of this invention to provide a system for compressing two video signals corresponding to respective video programs into a standard video channel using conventional carrier frequencies.

It is also an object of this invention to provide a system for transmitting two video programs in one video channel wherein the video picture quality of either video program is not degraded below that of commercially acceptable non-broadcast video media.

It is a further object of this invention to provide a system for compressing two video programs into one video channel, wherein decompression circuitry is easily incorporated in conventional television tuners.

It is additionally an object of this invention to provide a system for transmitting two video programs in one video channel without adversely affecting the audio carrier.

It is yet a further object of this invention to provide an encoder arrangement wherein two video programs are combined into a single video channel.

It is also another object of this invention to provide a decoder arrangement wherein two video programs are extracted from a single video channel.

It is yet an additional object of this invention to provide an encoder arrangement wherein two video signals corresponding to respective video programs are compressed into a single video channel.

It is still another object of this invention to provide a decoder arrangement wherein a compressed video signal in a single video channel is decompressed into two video programs.

It is a yet further object of this invention to provide a system wherein two video programs are compressed into a single video channel in accordance with a predetermined scrambling arrangement whereby neither video program is viewable without authorization.

It is also a further object of this invention to provide a system wherein two video programs are compressed into a single video channel in accordance with a scrambling arrangement which is changeable on a frequent basis to enhance security from unauthorized viewing.

It is additionally another object of this invention to provide a system wherein two video programs are compressed into a single video channel in accordance with a scrambling arrangement, and wherein changeable scrambling data is transmitted with the single video channel for facilitating descrambling at a receiver of the single video channel.

SUMMARY OF THE INVENTION

The foregoing and other objects are achieved by this invention which provides a method of combining first and second video signals for transmission via a single video channel, and apparatus therefor. Each of the first and second video signals is of the type having a luminance component within each of a plurality of sequentially recurring horizontal line periods. In accordance with a first method aspect of the invention, there are provided the steps of:

- first separating a luminance component of the first video signal during a respective first horizontal line period;
- second separating a luminance component of the second video signal during a respective first horizontal line period;
- first time compressing the luminance component of the first video signal by a predetermined compression factor;
- second time compressing the luminance component of the second video signal by a predetermined compression factor;
- forming an output video signal having a plurality of sequential output horizontal line periods;
- first inserting the time-compressed luminance component of the first video signal in a selected one of the output horizontal line periods; and
- second inserting the time-compressed luminance component of the second video signal in a selected one of the output horizontal line periods.

In one embodiment of this first method aspect of the invention, the first horizontal line periods associated with the first and second video signals are substantially simultaneous with one another. Separation of the luminance components includes the steps of digitizing the luminance of the first video signal to produce first digital data which corresponds to the information in the first digital signal. The digital data is then written into a first memory location. The same is done for the second video signal, the corresponding second digital data being written into a second memory location. Compression and decompression are achieved by reading the digital data into and out of the memory locations at difference clock speeds. Thus, digital data which is read out of the memory at twice the clock rate at which it was entered will be compressed by a factor of two. The compression factor therefore is related to the ratio of the read-to-write clock rates.

In embodiments of this first aspect of the invention where the first and second video signals are color video signals, the first chroma components of the first and second video signals are separated from respective first horizontal line periods. The chroma components are then compressed, illustratively by a factor of approximately 8:1, and then are inserted in the output horizontal line periods of the corresponding luminance components. In a highly advantageous embodiment of the invention, the chroma components are repeated at the receiving end and are applied in this specific illustrative embodiment, to two successive respective luminance components. The inventor herein has determined that the sharing of chroma information by successive luminance components will not degrade the picture quality below that to which video consumers have become accustomed, such as the picture quality associated with conventional VHS video record and playback systems.

In the specific illustrative embodiment of the present first method aspect of the invention wherein two video programs are compressed into a single video channel, the chroma components associated with the original luminance components and the shared chroma components are compressed using a compression factor of approximately 8:1. The compressed components are then inserted into compressed synchronization data portions of the selected output horizontal line periods (modified analog signal). More specifically, each output horizontal line period, which may have a conventional overall duration of approximately 63.5 μs is divided into two output horizontal line subperiods, each such subperiod containing the compressed luminance component and an associated chroma component. In an embodiment of the invention where the two luminance components in a single output horizontal line period both correspond to the same input video channel, both such luminance components will share the chroma component which was originally associated with only one of such luminance components. The second luminance component will "borrow" the chroma information which was associated with the other luminance component, and the resulting picture degradation is acceptable. The highly compressed chroma information is inserted into the synchronization data portion of one of the output horizontal line subperiods.

The system of the present invention is not limited to placement of two successive luminance components associated with any given input video program into a single output horizontal line period. Thus, for example, in this dual input program embodiment of the invention, a luminance component from each of the input programs can be inserted into each output horizontal line period, or two successive luminance components from either of the input video programs can be inserted into any such output horizontal line period, or any other arrangement of input video program luminance components can be inserted in accordance with a predetermined scrambled sequence. Data associated with the scrambled sequence can be transmitted in the output video signal.

Oftentimes, DC levels will drift during a field of horizontal line periods, causing, in the context of chroma signals, color shifts which are visible over the field. In one embodiment of this first method aspect of the invention, there is provided the step of inserting a chroma clamp pulse in a predetermined time period associated with each luminance component in the recurring output horizontal line periods. The luminance and/or chroma components can be compressed, in this embodiment, slightly further to produce the predetermined time interval which will accommodate a chroma clamp pulse. In this embodiment, the chroma clamp pulse has an amplitude which is related to the mid-level of the chroma component. Sufficient DC clamping is achieved by inserting the chroma clamp pulse into every other one of the output horizontal line periods. In a still further embodiment, a sync pulse can be inserted into the predetermined time intervals associated with intermediate ones of the output horizontal line periods. Thus, the predetermined time intervals of the recurring output horizontal time periods contain alternating ones of a chroma clamp pulse and a sync pulse.

In accordance with a further method aspect of the invention, there is provided a method of decoding a source video signal to produce a plurality of video channels therefrom. This method aspect includes the step of forming a first video signal having a plurality of sequential horizontal intervals. A step of forming includes the additional steps of:

extracting from the source video signal a first luminance component signal related to a first one of the plurality of video channels;

inserting said first luminance component signal in a first one of said horizontal intervals of said first video channel;

extracting from the source video signal a second luminance component signal related to the first video channel;

inserting said second luminance component signal in a second one of said horizontal intervals of said first video channel:

extracting from the source video signal a first chroma component signal related to the first one of the plurality of video channels;

inserting said first chroma component signal in said first one of said horizontal intervals of said first video channel; and inserting said first chroma component signal in said second one of said horizontal intervals of said first video channel, whereby said first chroma component signal is repeated in said second one of said horizontal intervals.

In accordance with this further method aspect of the invention, there is provided a further step of forming a second video channel having a plurality of sequential horizontal intervals. This further step of forming includes the steps of extracting first and second luminance components from a second one of the plurality of video channels, and inserting said extracted luminance components into first and second ones of the horizontal intervals of the second video channel. In addition, a first chroma component is extracted from the source video signal related to the second one of the video channels, the extracted first chroma component then being inserted in the first one of the horizontal intervals of the second video channel, and repeated in a second one of the horizontal intervals of the second video channel. Thus, two sequential lines of luminance share the chroma component associated with one of them.

In accordance with a still further method of decoding a source video signal to produce a plurality of video channels therefrom, the method includes the step of forming first and second video channel signals. Each of the video channel signals has a respective plurality of sequential horizontal intervals, and the step of forming includes the further steps of:

extracting from the source video signal a first luminance component signal related to a first one of the plurality of video channels;

inserting said first luminance component signal in a first one of said horizontal intervals of said first video channel;

extracting from the source video signal a second luminance component signal related to the first video channel;

inserting said second luminance component signal in a second one of said horizontal intervals of said first video channel;

extracting from the source video signal a first luminance component signal related to a second one of the plurality of video channels;

inserting said first luminance component signal in a first one of said horizontal intervals of said second video channel;

extracting from the source video signal a second luminance component signal related to the second video channel; and inserting said second luminance component signal in a second one of said horizontal intervals of said second video channel.

In accordance with this still further method aspect of the invention, an prior to performing the steps of inserting the first and second luminance component signals in the horizontal intervals of the first and second video channels, there is provided the further step of expanding in time each of the first and second luminance component signals. In his specific illustrative embodiment of the invention, the expansion in time is achieved by a factor of approximately two (2).

In an illustrative embodiment of this further method aspect of the invention, a chroma component signal related to the first one of the plurality of video channels is extracted from the source video signal. The first chroma component is expanded in time by a factor which is greater than two (2). The expanded first chroma component signal is then inserted in one of the horizontal intervals of the first video channel. Additionally, the expanded first chroma component signal is repeated in a second one of the horizontal inputs of the first video channel.

Chroma information is added, in certain embodiments of this further method aspect of the invention, to the second video channel. A first chroma component signal related to a second one of the plurality of video channels is extracted from the source video signal. This first chroma component signal is expanded in time by a factor greater than two (2) and inserted in a first one of the horizontal intervals of the second video signal and repeated in a second one of the horizontal intervals of the second video channel. In some embodiments of the invention, the steps of expanding in time the first and second chroma component signals are performed by a factor of approximately eight (8).

In accordance with an apparatus aspect of the invention, an encoding system is provided for combining a plurality of video source channels to form an output video channel for transmission. In accordance with the invention, first and second color decoders, each having a video input for receiving a respectively associated input video signal corresponding to one of the video source channels, are used to separate the input video signal into respective luminance and chroma signals at respective luminance and chroma outputs. A compressor compresses in time the luminance and chroma signals. Additionally, a multiplexer is coupled to the compressor for selecting alternately between the first and second color decoders.

In one embodiment of this apparatus aspect of the invention, the compressor includes a first compressor which is coupled to the first color decoder for compressing in time the luminance signal issued thereby. A second compressor is coupled to the second color decoder for compressing in time the luminance signal issued by the second color decoder. A third compressor, which is coupled to the first color decoder, compresses in time the chroma signal issued by the first color decoder, and a fourth compressor which is coupled to the second color decoder, compresses in time the chroma signal issued by the second color decoder. In a specific illustrative embodiment of the invention, the first and second compressors compress the luminance signals which are issued by the first and second color decoders by a factor of approximately two (2).

Each of the first and second compressors includes an analog-to-digital converter having an input for receiving a respectively associated one of the input video signals, and an output for issuing corresponding digital data. A memory receives the corresponding digital data from the analog-to-digital converter. A first clock pulse source having a first determined frequency characteristic is coupled to the analog-to-digital converter and to the memory for determining a rate at which the corresponding digital data from the analog-to-digital converter is entered into the memory. A digital-to-analog converter is provided having an input for receiving the corresponding digital data from the memory. A second clock pulse source has a second determined frequency characteristic and is coupled to the memory and to the digital-to-analog converter for determining a rate at which the corresponding digital data from the memory is entered into the digital-to-analog converter. In a specific illustrative embodiment of the invention, the first and second determined frequency characteristics have a relative frequency relationship of approximately 1:2. In a still further embodiment, the third and fourth compressors compress the chroma signals which are issued by the first and second color decoders by a factor of approximately eight.

In a highly advantageous embodiment of the invention, the luminance signal includes luminance information which corresponds to respective horizontal periods, and the chroma signal includes chroma information which is associated with luminance information corresponding to a respectively associated predetermined horizontal period. The chroma information is repeated over a subsequent horizontal period, thereby avoiding the need to transmit over the propagation medium the chroma component associated with each luminance component. The sharing of chroma information between consecutive luminance components of a given video signal reduces the net information content of the transmitted signal, thereby enabling a second video program to be transmitted over the same video channel.

In accordance with a further apparatus aspect of the invention, a decoder system is provided for extracting a plurality of video channels from an encoded video signal. In accordance with the invention, an analog-to-digital converter is provided with an input for receiving the encoded video signal and a luminance output for issuing luminance digital data which corresponds to a luminance component of the encoded video signal. A luminance expander coupled at an input thereof to the analog-to-digital converter expands in time the luminance digital data, whereby time-expanded luminance digital data is issued at an output thereof. Additionally, a demultiplexer is provided with an input coupled to the expander. The demultiplexer produces at an output thereof the time-expanded luminance digital data corresponding to alternating respective ones of the video channels.

In one embodiment of the invention, the video channels which are to be combined and transmitted are color video channels, and accordingly there is further provided a chroma output coupled to the analog-to-digital converter for issuing chroma digital data corresponding to a chroma component of the encoded video signal. The chroma expander is coupled at an input thereof to the analog-to-digital converter for expanding in time the chroma digital data. In this manner, the time-expanded chroma digital data is issued. A chroma output is coupled to the demultiplexer for producing portions of the time-expanded chroma digital data corresponding to respective ones of the digital channels. In this embodiment, there is further provided a color encoder for combining the luminance and chroma digital data to form at an output thereof a video signal which corresponds to at least one of the plurality of video channels.

In accordance with a still further method aspect of the invention, there is provided a method of scrambling first and second video signals for transmission via a signal video channel. Each of the first and second video signals is of the type having a luminance component within each of a plurality of sequentially recurring horizontal time periods. In accordance with the invention, there are provided the steps of:

first separating a luminance component of the first video signal during a respective first horizontal line period;

second separating a luminance component of the second video signal during a respective first horizontal line period;

first time compressing the luminance component of the first video signal by a predetermined compression factor;

second time compressing the luminance component of the second video signal by a predetermined compression factor;

forming an output video signal having a plurality of sequential output horizontal line periods;

determining a predetermined scrambling pattern related to said sequential output horizontal line periods;

first inserting the time-compressed luminance component of the first video signal in a one of the output horizontal line periods selected in response to said predetermined scrambling pattern; and second inserting the time-compressed luminance component of the second video signal in a one of the output horizontal line periods selected in response to said predetermined scrambling pattern.

In one highly advantageous illustrative embodiment of the invention, there is provided the further step of incorporating into the output video signal data corresponding to the predetermined scrambling pattern. In this manner, the location of the luminance component in the output horizontal line periods is determined. The step of determining a predetermined scrambling pattern includes, in a further embodiment, the further step of dividing the sequential output horizontal periods into respective subperiods of the sequential output horizontal line periods. In addition, there are provided the steps of determining a predetermined subperiod scrambling pattern and incorporating in the output video signal data corresponding to the predetermined subperiod scrambling pattern, whereby the location of the luminance component in the subperiods of the output horizontal line periods is determined.

The present disclosure shows that by using a combination of analog and digital techniques it is possible to compress two video signals into one standard 6 MHz video channel using standard carrier frequencies. This inventive technique results in a net reduction in bandwidth, which reduction is not excessive, and produces a picture quality which is quite acceptable. Such picture quality is on a par with that to which the public has become accustomed, such as with movies shown using VHS reproducing equipment which has a bandwidth capability which is considerably reduced, as compared to a broadcast system.

In a conventional video signal approximately twenty percent of the horizontal line period is taken up by horizontal blanking which contains synchronizing data. Replacing this blanking with active data results in twenty percent more efficient use of the time allocation for each horizontal line. As stated, sync and horizontal blanking intervals, both of which are repetitive and easily regenerated from the vertical interval pulse train using standard phase locked loop techniques, are used at the receiving end of the system to create standard video color signals which can be used with any conventional color television receiver.

One of the major advantages of this system is that the compressed signal is contained within the standard 4.2 MHz band which generally is allocated to video. It can therefore directly be employed in any video transmission system, doubling is program capacity. The decompression units can easily be connected to standard tuners which provide base band video outputs, without modification. Audio scrambling of the audio carrier is not adversely affected by this system.

BRIEF DESCRIPTION OF THE DRAWINGS

Comprehension of the invention is facilitated by reading the following detailed description, in conjunction with the annexed drawing, in which:

FIG. 8 is a function block representation of a time compressor arrangement;

FIG. 9 is a function block representation of a time expander;

DETAILED DESCRIPTION

A typical system constructed in accordance with the principles of the invention, as will be described herein in the context of a specific illustrative embodiment of the invention, employs one encoder for each pair of video channels at the transmitting end, and a multitude of decoders, generally located at each subscriber location. Each encoder combines two color video signals to form a modified analog signal, and supplies same to a single modulator. The bandwidth of the modified analog signal is 4.2 MHz and it therefore is conventional in its bandwidth characteristic and does not require any special modulation techniques. Conventional modulators for video and audio may be used. This characteristic provides it with the advantage of being easily adaptable to any existing cable system, over-the-air broadcast, satellite transmission system, or wireless cable system. As will be described, at the receiving end, the baseband output of the tuner/demodulators is supplied to a decoder which splits it into two standard color video signals, each of which can be processed by standard television receivers.

The two video signals used as inputs to the encoders will be referred to as Channel A and Channel B, respectively. Each decoder will therefore provide two output video signals.

The present inventive process of video signal compression begins with demodulation of each of the video signals into its respectively associated luminance and color components, generally referred to as Y, U and V. Y is the luminance component, and U and V are the two color components. There are several methods commonly employed for achieving such demodulation, one of which is to use the known Philips TDA9141 system, which accepts a composite color signal and separates same into the Y, U, and V components.

Figure 1:
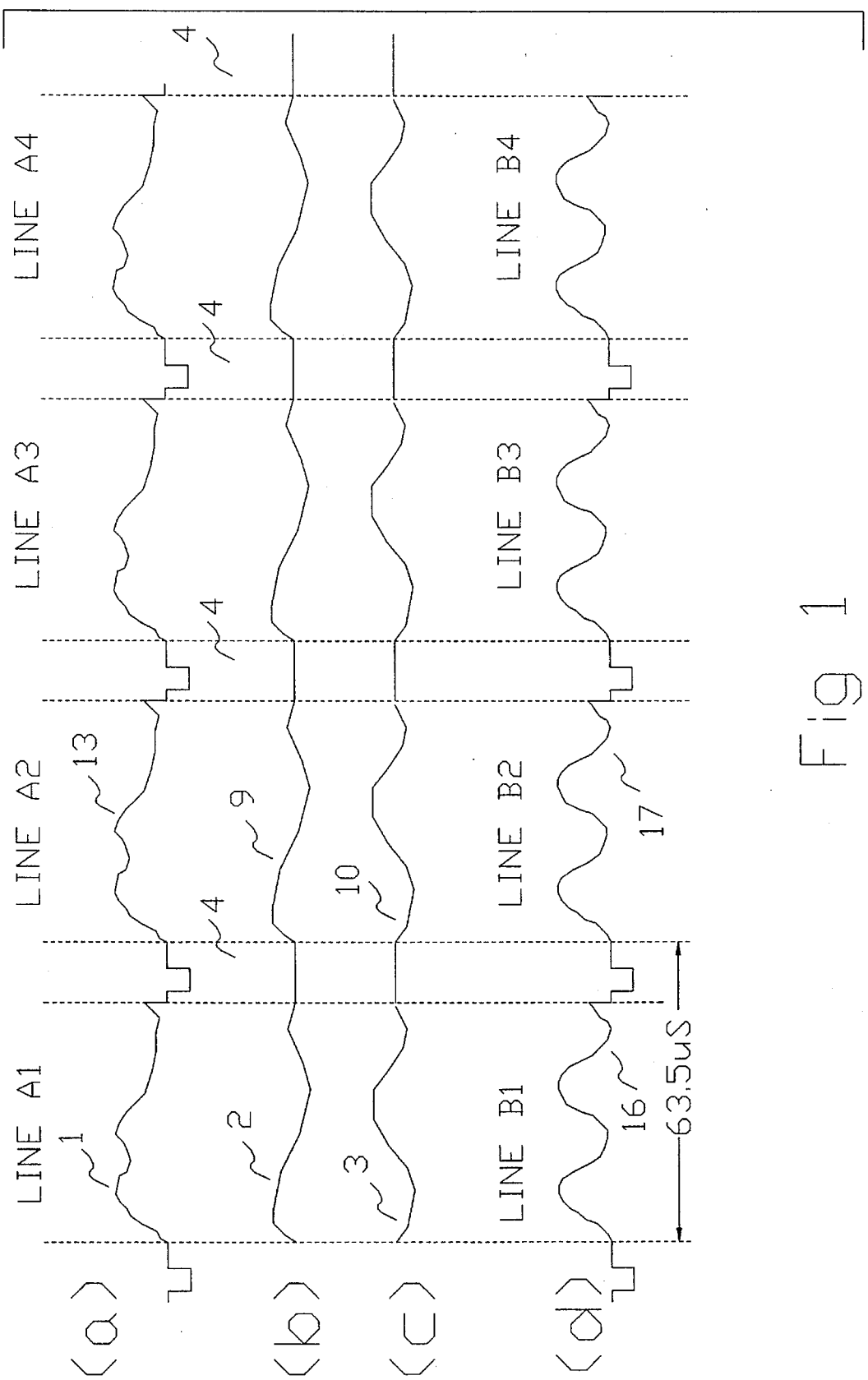
FIG. 1 is a graphical representation of a plurality of horizontal line periods which are useful in explaining the temporal relationship between the luminance components of pair of input video channels, and respectively associated chroma components.

FIG. 1 is a graphical representation of a plurality of video signal components shown on a common time scale. The composite video signals are not shown in FIG. 1, for sake of simplicity of the drawing. FIG. 1(a) shows a luminance component signal 1 which corresponds to the luminance component (Y) of a video channel A (not shown in this figure). FIG. 1(b) shows a U-color component signal 2 which corresponds to a first color component (U) of video channel A, and FIG. 1(c) shows a V-color component signal which corresponds to a second color component (V) of the same video channel. As stated, the figures are arranged on a common time scale to illustrate the correct timing relationships between the component signals.

Luminance component signal 1 and U-color and V-color component signals 2 and 3 are each associated with a single line (A1) of video channel A. Similarly, luminance component signal 13 and U-color and V-color component signals 9 and 10 are each associated with an immediately subsequent line (A2) of video channel A.

FIG. 1(d) shows a luminance component signal 16 which corresponds to the luminance component (Y) of a second video channel B (not shown in this figure). The color component signals of channel B are not shown in this figure, but are similar in appearance to those shown in FIGS. 1(b) and 1(c). FIG. 1 shows four consecutive lines of each of the two video channels. Also as shown in FIG. 1, each of the line intervals A1 to A4 has a duration of 63.5 µs, and consists of the sum of its respective signal duration and its respective blanking interval 4. In this embodiment, the signal portion of the interval is about 80% of the 63.5 µs, i.e., specifically 52.7 µs, and the blanking intervals 4 are each about 20% of the 63.5 µs, i.e., specifically 10.8 µs. The signal portions are therefore each about four times the duration of their respectively associated blanking intervals.

Figure 2:
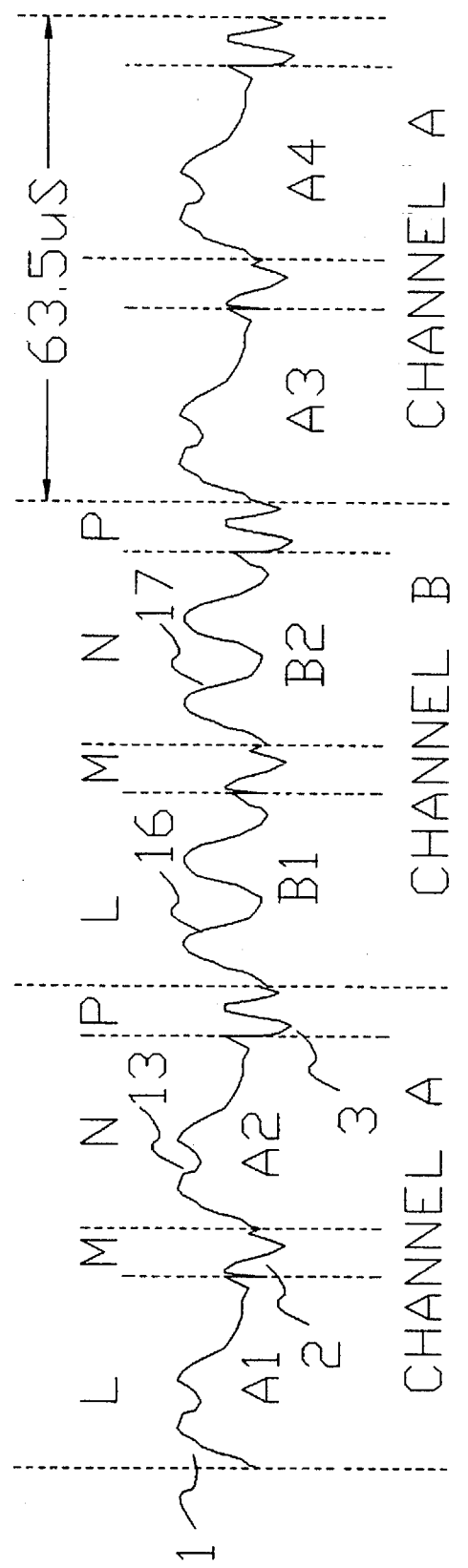
FIG. 2 is a graphical representation of a plurality of video signals after they have been compressed and inserted into subperiods within a plurality of sequential output horizontal line periods.

FIG. 2 is a graphical representation of an output video signal in analog form, hereinafter the "modified analog signal" wherein the video information of channels A and B has been compressed and accommodated. This one output video channel therefore contains the two input video channels, A and B. In accordance with a specific illustrative embodiment of the invention, the modified analog signal can be transmitted within a standard video bandwidth. Also in this specific illustrative embodiment of the invention, every alternate 63.5 µs time interval of the output video signal of FIG. 2 contains the luminance component signal of two consecutive lines of the same channel, as well as the color components of one of the two lines.

Channel A and channel B, in this specific illustrative embodiment of the invention, occupy respective alternate lines. Each of the output horizontal line interval is divided, in this embodiment, into four intervals, identified as intervals L, M, N, and P, which total 63.5 µs in combined duration. In this specific illustrative embodiment of the invention, signal portions L and N are each about four times the duration of each of the blanking intervals M and P, thereby maintaining in this embodiment the same relative proportions as prior to compression (shown uncompressed in FIG. 1). The first 63.5 µs horizontal line period identified as channel A in FIG. 2 is shown to contain two luminance component signals, 1 and 13, which are shown uncompressed in FIG. 1(a). The luminance component signals, therefore, have been compressed into one-half of the original (input) time, as will be described below.

U-color component signal 2, shown uncompressed in FIG. 1(b), is compressed in a manner which will be described below to about one-eighth of its original duration and inserted in interval M in the first channel A of the output video signal shown in FIG. 2. Similarly, V-color component signal 3, shown uncompressed in FIG. 1(c), is also compressed to about one-eighth of its original duration and inserted in interval P in the first channel A of the output video signal shown in FIG. 2.

Luminance component signal 13, which is shown uncompressed in horizontal line interval A2 shown uncompressed in FIG. 1(a) is compressed in time to about one-half of its uncompressed duration, as will be discussed below, and is inserted into interval N of channel A of the modified analog signal shown in FIG. 2. U-color and V-color component signals 9 and 10, shown uncompressed in FIG. 1, are discarded and not transmitted. As will be described hereinbelow with respect to the receiving end of the system, luminance component signals 1 and 13 will be expanded in time to their original duration in this embodiment. However, both luminance signals will share chroma signals 2 and 3.

Of course, in other embodiments of the invention, the chroma components associated with luminance component 13, i.e., U-color component signal 9 and V-color component signal 10, could be used instead of chroma signals 2 and 3, or any combination thereof.

The vertical resolution of this system is somewhat reduced because chroma information is repeated for two consecutive lines. This does not pose a significant problem. Since the visual acuity of the viewer for color is considerably less than for luminance, the vertical resolution becomes approximately the same as the horizonal resolution of VHS equipment.

In a manner similar to that described hereinabove, the luminance and color components of the other video signal, i.e., channel B, are compressed into the next 63.5 µs output horizontal line period shown in FIG. 2. The luminance component of line B1, designated 16 in FIG. 1, is compressed and shifted in time to time segment L, associated with channel B, in the modified analog signal shown in FIG. 2. Similarly the luminance component of the next line 17, is time shifted into segment N. The two color components of the first line of channel B (not shown), are correspondingly compressed and time shifted. However, as was the case with channel A, the chroma components associated with luminance component 17 of channel B are discarded and not transmitted. Thus, both luminance components 16 and 17, in this embodiment, will share the chroma information associated with luminance component signal 16. As stated hereinabove with respect to channel A, any combination of two of the chroma components associated with channel B can be transmitted with the output video signal.

In a highly advantageous embodiment of the invention, the picture quality which is produced when chroma information is shared, as set forth hereinabove, can be improved using a chroma interpolation technique. More specifically, and by way of example, consider four sequential lines, denominated for purposes of the present example as line 51, line 52, line 53, and line 54. The chroma information associated with line 51 (i.e., "chroma 51") is shared with line 52, and similarly, the chroma information associated with line 53 (i.e., "chroma 53") is shared with line 54. Chroma 51 and chroma 53 are, in this specific illustrative embodiment of the invention, mathematically interpolated to determine a mean, or average, chroma signal which is applied to line 52. Thus, line 52 is supplied color information which is mathematically intermediate of the color information of its neighboring lines, 51 and 53. Similarly, the color amplitude (saturation) can be averaged, or reduced somewhat, at the receiving end of the system, such that any color mismatches which would result with regard to those lines which do not have at the receiving end their respectively associated chroma components (i.e., lines 2 and 4 in the present example) are not made prominent in the video image.

In accordance with the principles of a specific illustrative embodiment of the present invention, compression of two channels into a single output channel, includes the formation of a time period which equals the period of one horizontal television line, and dividing that period into two equal primary segments, as shown in FIG. 2. Each of these two segments are further subdivided into two segments as shown in FIG. 2., one of which is one quarter the length of the other. That is, in the interval formed by the sum of segments L and M, L is the longer segment, and in the interval formed by the sum of segments N and P, N is the longer segment. These segments are repeated every horizontal line period of the output video signal shown in FIG. 2. The L+M and the N+P time intervals are each 63.5/2=31.75 µs. The L and N time segments are each four fifths of that, which is 25.4 µs. The time occupied by one horizontal line is approximately 52.7 µs. This system compresses the 52.7 µs period into a 25.4 µs period. The compression factor, therefore, is 25.4/52.7= 0.48; approximately one-half The M and P time segments are approximately one quarter of the L and N time segments, or 25.4/4=6.35 µs. The compression factor which is applied to the U-color and V-color component signals, in this specific illustrative embodiment of the invention, is 6.35/52.7=0.12; or approximately one-eighth.

Using the digital techniques which will be described hereinbelow, wave forms can be compressed or expanded to any desired extent, and shifted in time. The process involves using an analog-to-digital converter, writing the data thus obtained into a digital memory and then reading the output of that memory into a digital-to-analog converter, thus transforming the signal back to its analog condition. The clock frequency used for writing must be at least twice the highest frequency component which is present in the analog signal being processed. In this specific illustrative embodiment of the invention, the clock frequency selected would be approximately 7.12 MHz because it is conveniently available in a video environment, being about twice the color subcarrier frequency. The reading frequency would then be twice this, or about 14.32 MHz. By manipulating the read and write clock frequencies the signal can be expanded or compressed in time. Doubling the read frequency results in halving of the period of the analog line read out. By changing the start of the read cycle, the signal can also be shifted in time, as desired.

Generally, simple lossless compression of any analog signal increases the bandwidth by the same ratio as the compression. For instance, if an analog signal is compressed in time by a factor of two, then its bandwidth will be twice as wide. By way of example, if a 1 MHz sine wave was compressed to occupy half the time it normally occupies, it becomes a 2 MHz sine wave. Simple lossless expansion does the reverse, in the same relative proportion.

In the practice of the specific illustrative embodiment of the invention, the time frame for the writing and reading of the signals shown in FIG. 1 are indicated as being approximately the same. This is a simplification which is useful for the purpose of facilitating the present explanation. In actual practice, there is no reason why the writing and reading must occur at approximately the same time. Writing merely consists of entering data into a memory. Once placed there, it could be read out at any time. If the delay between reading and writing was almost a whole frame, it would appear that the reading was occurring before the writing. For instance one could be writing on line 85 of the memory (not shown in this figure) and reading on line 83 thereof. What is actually happening is that the data on the previous frame was being read out on line 83.

FIGS. 3(a) to 3(d) are graphical representations which illustrate respective ones of a plurality of expanded video signal components (FIGS. 3(a) to 3(c)), as well as an expanded composite video signal (FIG. 3(d)), on a common time scale. Using the digital techniques described hereinbelow, employing an analog-to-digital converter, memories, and a digital-to-analog converter, the modified analog signal is expanded into the regular time slots used for video, thereby reversing the compression which occurred at the encoder (not shown) which resulted in the compressed signal of FIG. 2.

Figure 3:
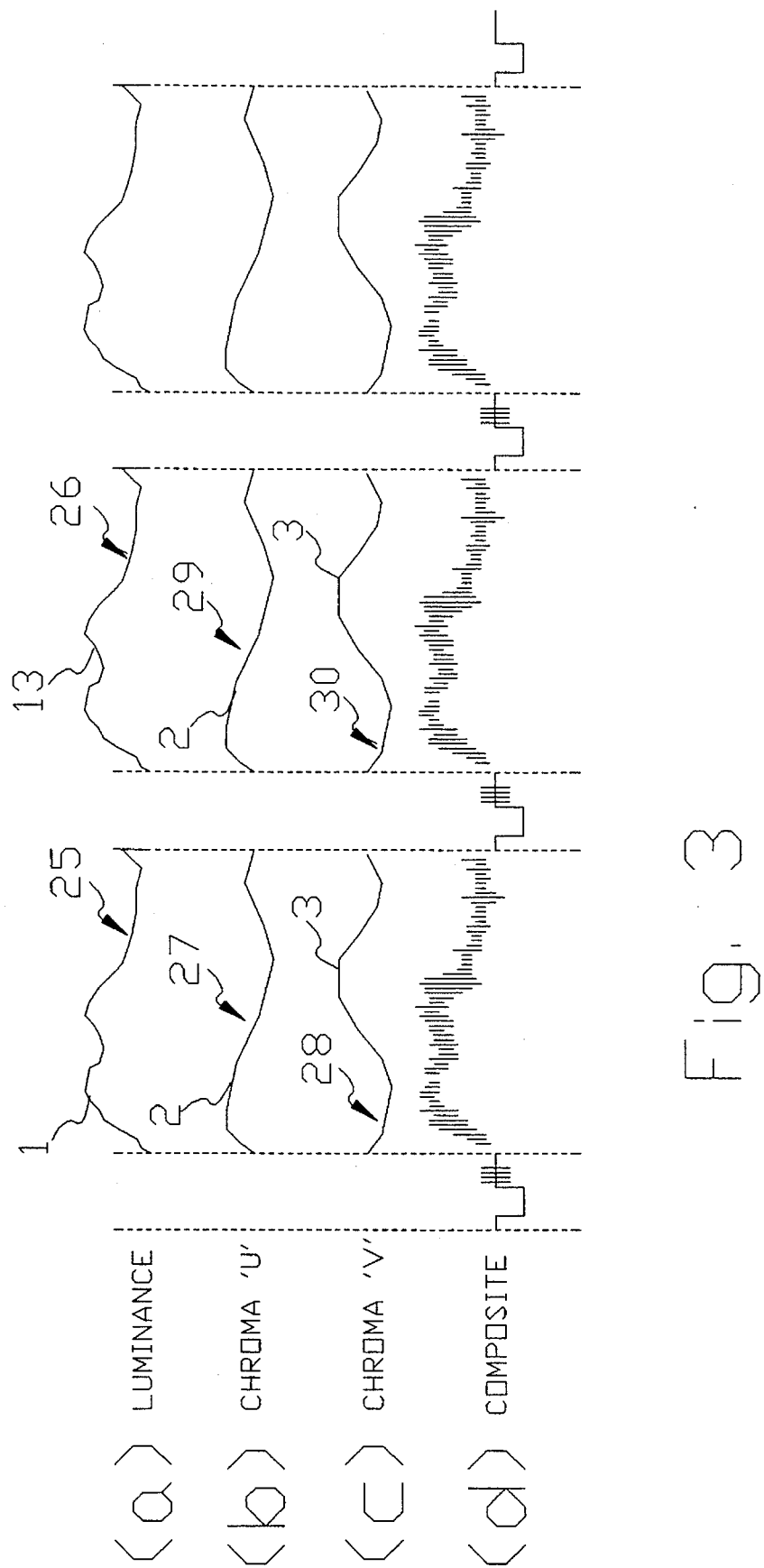
FIG. 3 is a graphical representation of a plurality of horizontal line periods showing the temporal relationship between luminance, chroma, and composite video signals.

FIG. 3 shows the relationships of the signal expansion and time shifting. The luminance component signal 1 of Channel A is expanded in time and time shifted into time slot 25, in FIG. 3(a). Similarly, U-color component signal 2 is expanded into concurrent time slot 27 in FIG. 3(b). In the same manner, the V-color component signal 3, is expanded and time shifted into concurrent time slot 28 in FIG. 3(c).

For the following line, the next compressed luminance signal 13 is expanded and time shifted into position 26 in FIG. 3(a). In order to supply chroma information to this line, which has been deleted in the transmission process, the U-color component signal 2 is repeated in segment 29 in FIG. 3(b). Similarly, V-color component 3 is reproduced in segment 30 in FIG. 3(c). In an alternative embodiment of the invention, instead of repeating the U-color and V-color component signals on two lines, two consecutive U-color component signals and two consecutive V-color component signals can be combined and modulated, and the so generated combined signal is supplied for the line which did not have its original chroma information transmitted. Channel B is reproduced in the same manner as just described.

Figure 4:
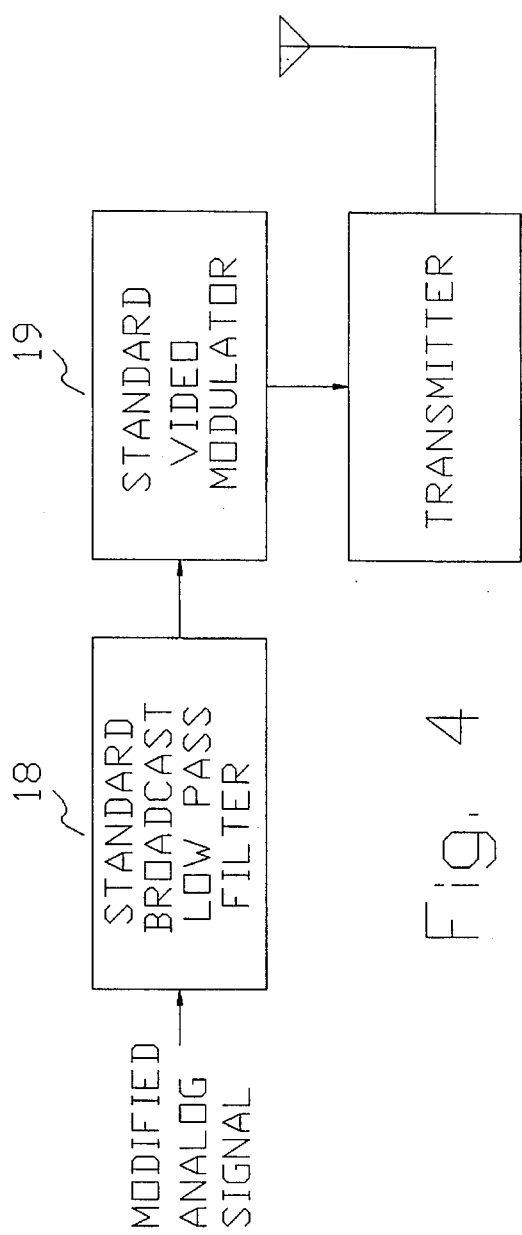
FIG. 4 is a block diagram of a transmission arrangement which is useful in the practice of the present invention.

FIG. 4 is a block diagram of a transmission arrangement which is useful for transmitting the modified analog signal if FIG. 2. As shown, the composite modified analog signal of FIG. 2 is supplied at an input of a standard broadcast low pass filter 18. Low pass filter 18, in this embodiment, has an upper frequency limit characteristic of 4.2 MHz. Low pass filter 18 is coupled at its output to a standard video modulator 19, and the band-limited modified analog signal is transmitted in a conventional manner.

Figure 5:
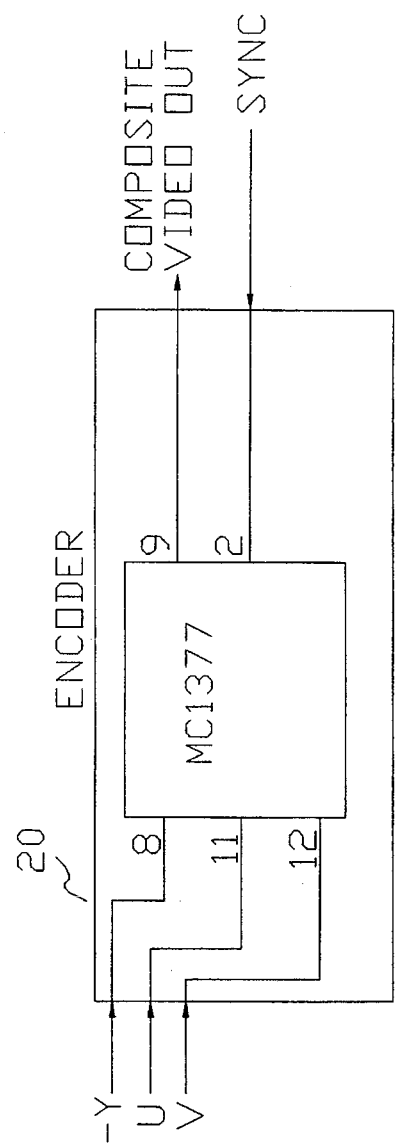
FIG. 5 is a partially schematic representation of an encoder arrangement which uses a commercially available integrated circuit chip.

FIG. 5 is a schematic representation of a color encoder circuit which employs an integrated circuit to combine the three component signals as a composite video signal, as shown in FIG. 3(*d*). One embodiment of the color encoder is the commercially available MC1377 integrated circuit manufactured by Motorola. The device is a self contained color encoder which only requires the inverted luminance signal supplied at its pin 8, the V-color component signal at its pin 12, and the U-color component signal at its pin 11. A sync signal, as described herein, is supplied at pin 2 of the MC1377 color encoder integrated circuit device. As shown, the composite video signal is provided at pin 9.

Figure 6:
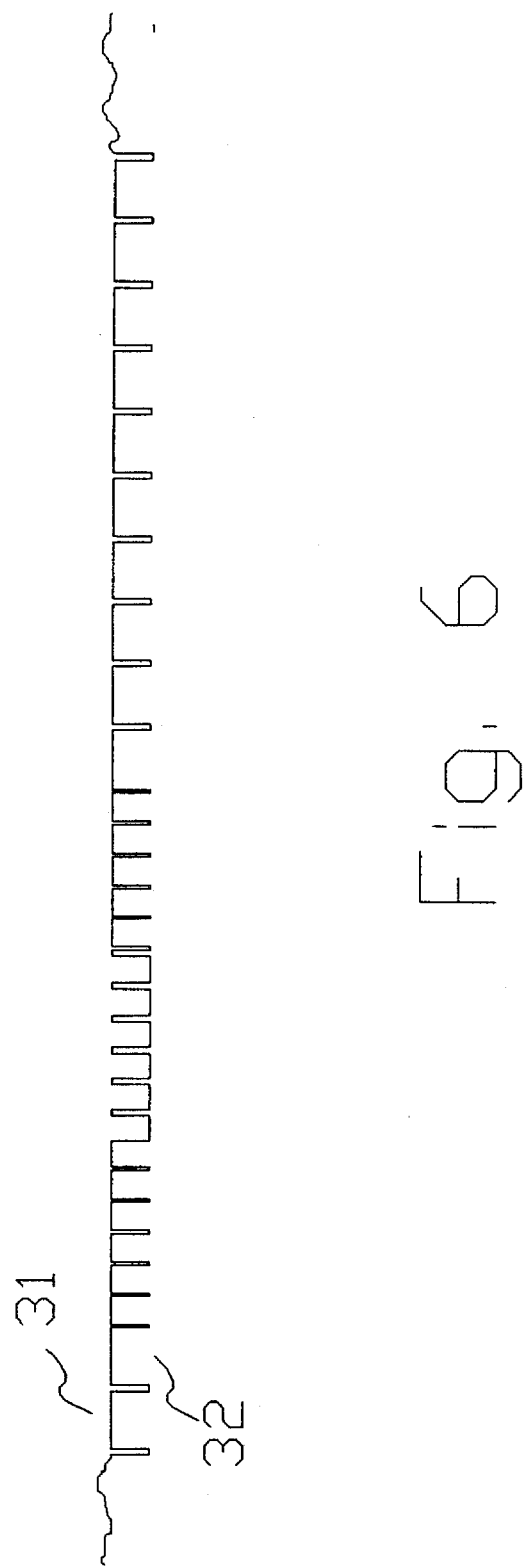
FIG. 6 is a graphic representation of a series of horizontal sync pulses.

FIG. 6 is a representation of a pulse train which controls video sync. In a conventional video signal, no video information is present between the first 20 lines in both fields. This interval, generally known as the vertical blanking interval contains both vertical and horizontal synchronizing pulses. The active lines of video usually start on line 20. The modified analog signal thus generated is transmitted as shown in FIG. 6, starting on line 19, which is one line ahead of the source signal.

The modified analog signal contains no horizontal sync information during the active picture period. However, as FIG. 6 shows, the modified analog signal does contain the normal vertical interval pulse train, which includes both vertical and horizontal information, from lines for the first 18 lines in both fields. The compressed data starts the 19th line and extends to the end of the field, terminating two lines before the first equalizing pulse at the end of even fields 31 and 32, shown in FIG. 6, and one and a half lines in the other field (not shown). These last lines are left blank.

At the receiving end (not shown in this figure), standard tuners are used to receive and demodulate the signal, resulting in the same modified analog signal as was transmitted. The vertical pulse train shown in FIG. 6 is similarly regenerated. Using conventional phase-lock loop sync generator techniques, the entire sync pulse train is regenerated at the decoder.

At the transmitting end, by appropriate manipulation of the read clocks and read start times relative to sync, the modified analog signal is advanced one line ahead of the picture information. Alternatively, the sync is delayed by one line relative to the modified analog signal. Persons of skill in the art can effect such manipulation of the read clocks and the read start times relative to sync, in light of the disclosure herein.

There not necessarily any correspondence in the encoder between the timing of the transmitted sync and the timing of either of the two input video signals, channels A and B, because all sync information is removed in the compression process. All that is left is data in memory, and the user is at liberty to use any other sync source for reading and transmitting the data. In the decoder, the same thing is possible. However, in order to reduce cost, it is better to use the same sync timing reference for the output as is contained in the modified analog signal. When that is done, the relationship between the decoded Y, U, V signals and the modified analog signal becomes approximately as shown in FIGS. 3(*a*) to 3(*d*). There is approximately a one line delay between the incoming data and the expanded Y, U, and V signals. This is why if the transmitted data is advanced by one line relative to sync, the resulting video will have the correct relationship to sync.

Figure 7:
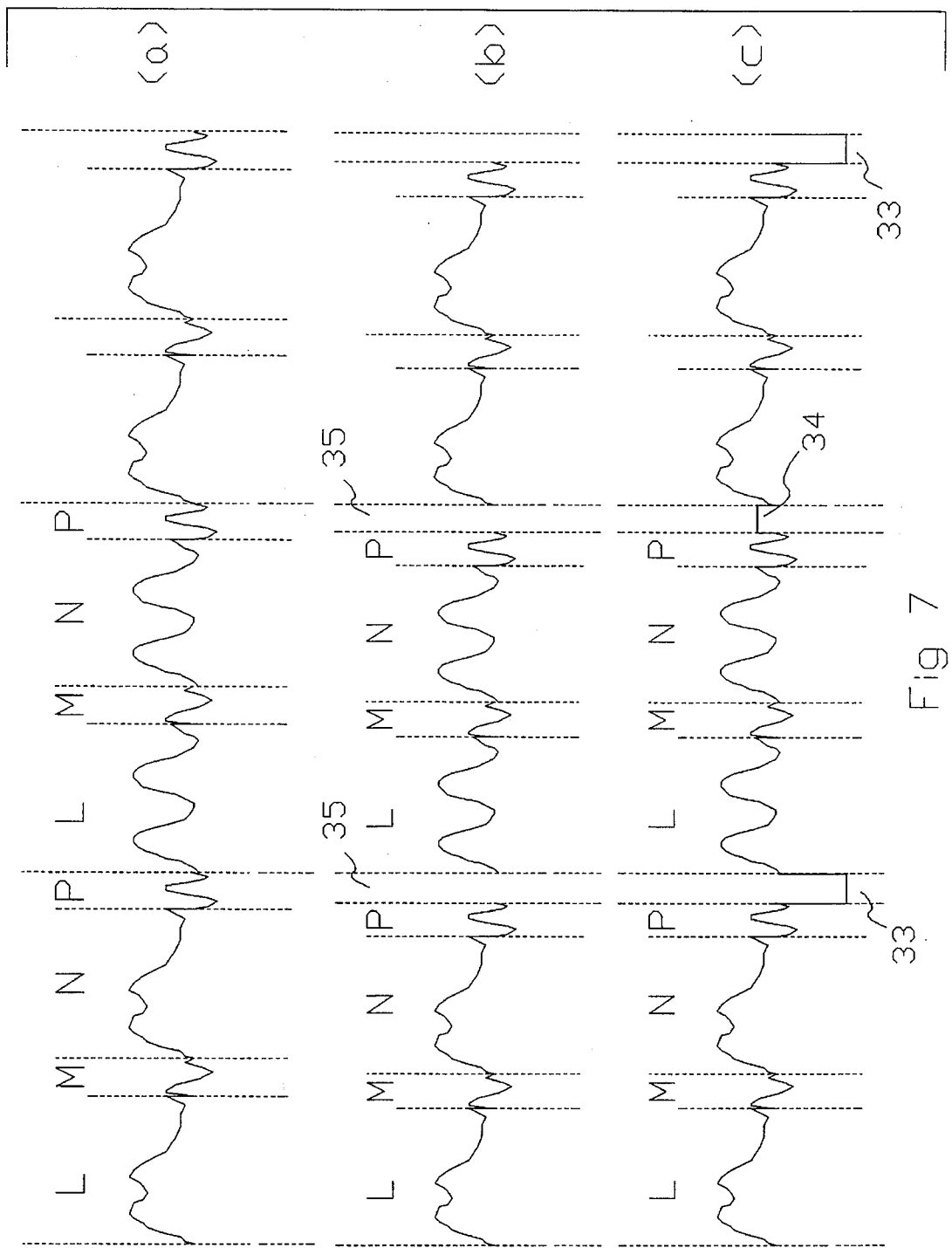
FIG. 7 is a graphical representation of a specific illustrative embodiment of the invention wherein the compressed video signals are further compressed to facilitate the formation of a time interval wherein DC clamp and sync pulses are inserted.

FIGS. 7(*a*) to 7(*c*) are graphical representations of compressed video signals. It is sometimes difficult to maintain DC level throughout the field. A shift in the DC level throughout the field results in color distortion and lack of color uniformity throughout the field. In accordance with a specific illustrative embodiment of the invention, a small flat datum level 34 (shown in FIG. 7(*c*)), which has an amplitude which corresponds to the mid amplitude of the U-color and V-color signals is inserted into the modified analog signal at periodic time intervals. Preferable, datum level 34 is inserted at the beginning of every alternate horizontal line. Those alternate lined which do not contain a datum level 34 are supplied with a narrow synchronizing pulse 33.

In order to introduce the datum levels and synchronizing pulses into the modified analog signal, the data in the modified analog signal is compressed by approximately an additional 2% in this specific illustrative embodiment of the invention. Such additional compression produces a time gap 35, shown in FIG. 7(*b*), having a duration of approximately 1 μs. Datum level 34 and synchronizing pulse 33 are inserted alternatingly into these time gaps 35, as shown in FIG. 7(*c*). At the decoder (not shown in this figure), using conventional clamping techniques, delayed clamp pulses (not shown) which are timed to occur in synchronism with datum level 34, are derived from the narrow synchronizing pulses 33, and are used to clamp the modified analog signal at datum level 34.

FIG. 8 is a block diagram of a 2:1 compressor arrangement which is usable in the practice of the present invention. An analog video signal 171 is provided to analog-to-digital converter 140 which produces a corresponding digital signal at its output. The digital signal is conducted to a memory 141 at a rate which is determined by 7 MHz oscillator 143. Thus, the digital information is read into the memory at a 7 MHz clock rate. Memory 141 is coupled at an output thereof to a digital-to-analog converter 142. The rate at which the digital data is read out of memory 141 is controlled by 14 MHZ oscillator 144. Since oscillator 144 operates at twice the clock rate frequency as oscillator 143, the digital data in memory 141 is read out in one-half of the time that it took to write the information in. This results in the analog signal produced at the output of digital-to-analog converter 142 to correspond to a compression of 2:1. As stated, the output signal has twice the bandwidth of original video signal 171. By changing the ratios of the read to write clock frequencies, other compression ratios are achieved.

FIG. 9 is a block diagram of a 2:1 expander arrangement which is usable in the practice of the present invention. An analog video signal 172 is provided to analog-to-digital converter 145 which produces a corresponding digital signal at its output. The digital signal is conducted to a memory 146 at a rate which is determined by 14 MHz oscillator 148. Thus, the digital information is read into the memory at a 14 MHz clock rate. Memory 146 is coupled at an output thereof to a digital-to-analog converter 147. The rate at which the digital data is read out of memory 146 is controlled by 7

MHZ oscillator 149. Since oscillator 149 operates at one-half of the clock rate frequency of oscillator 148, the digital data in memory 146 is read out in twice the time that it took to write the information in. This results in the analog signal produced at the output of digital-to-analog converter 147 to correspond to an expansion of 2:1. As stated, the output signal has twice the bandwidth of original video signal 172. By changing the ratios of the read to write clock frequencies, other expansion ratios are achieved.

Figure 10:
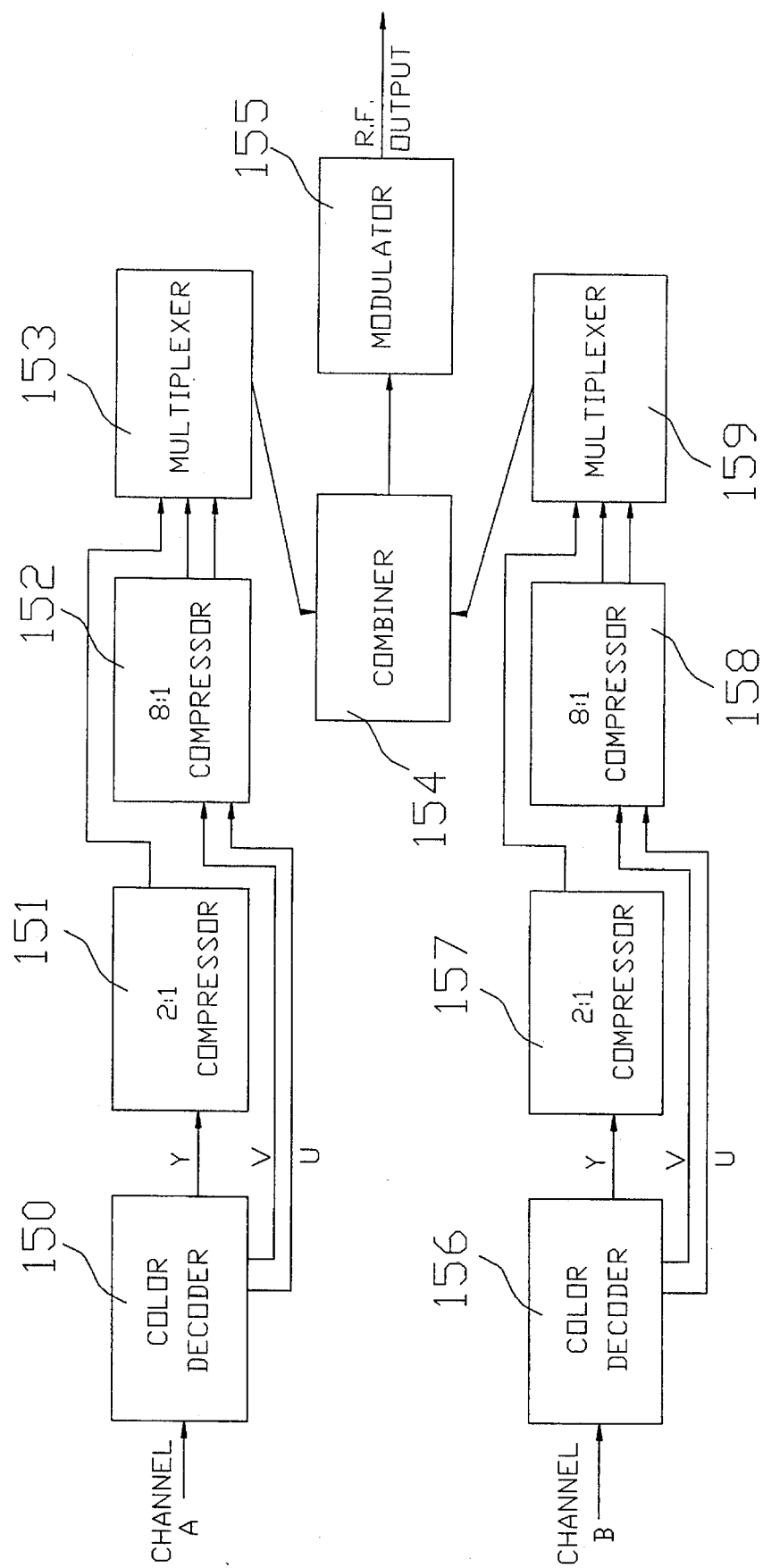
FIG. 10 is a function block representation of an encoder arrangement for combining channels A and B to form a signal video output which contains the information content of both such channels.

FIG. 10 is a block and line representation of a specific illustrative embodiment of an encoder constructed in accordance with the principles of the invention. The video signal from channel A is split into its luminance and chroma components by operation of a color decoder 150. The luminance component is compressed by about 2:1 in compressor 151, and the chroma components are compressed by about 8:1 in compressor 152. All such compressed components are conducted to respective inputs of a multiplexer 153.

In similar manner, the video signal from channel B is split into its luminance and chroma components by operation of a color decoder 156. The luminance component is compressed by about 2:1 in compressor 157, and the chroma components are compressed by about 8:1 in compressor 158. All such compressed components are conducted to respective inputs of a multiplexer 159. A combiner 154 further multiplexes the two signals from multiplexers 153 and 159, and produces at an output thereof a single output signal which is conducted to a video modulator 155.

Figure 11:
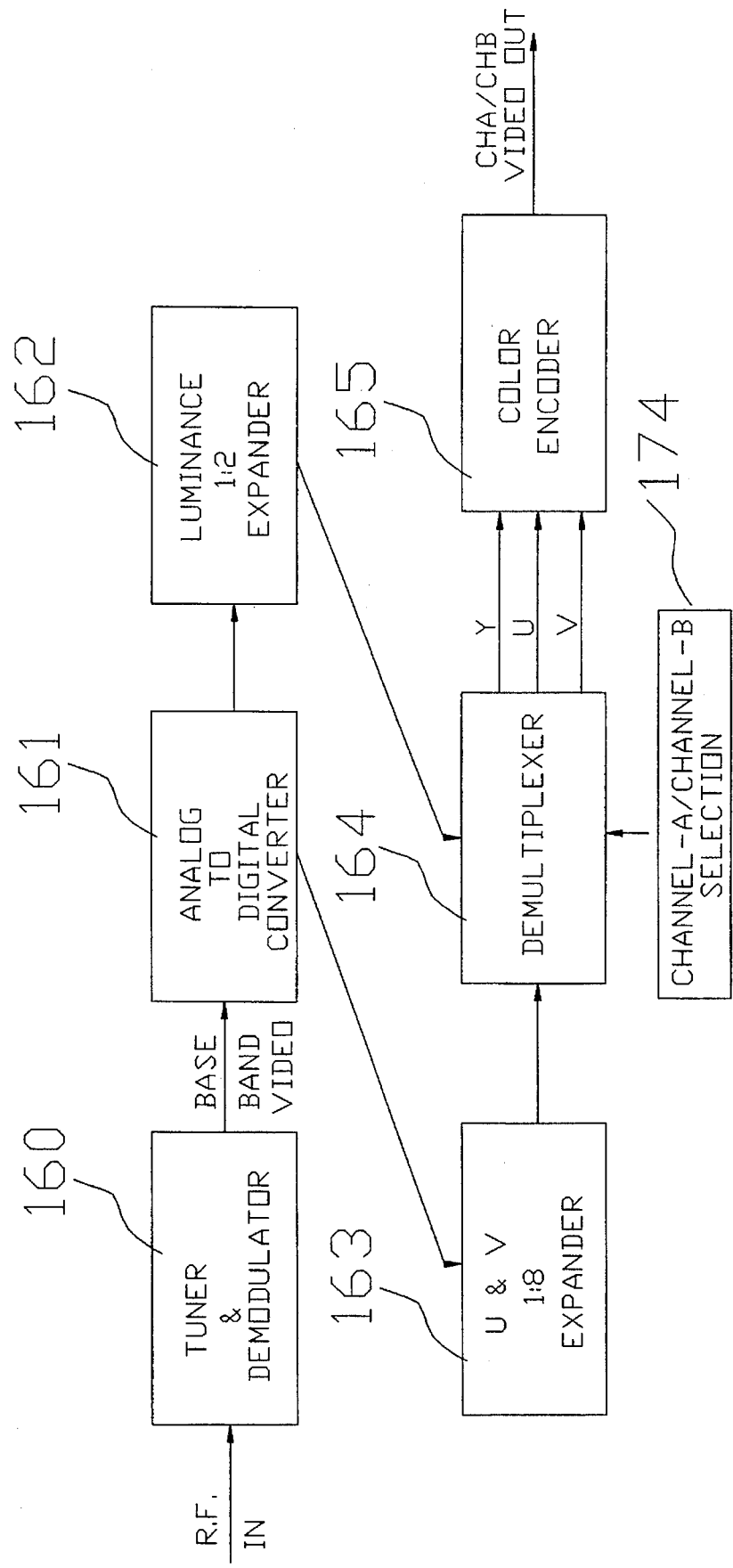
FIG. 11 is a function block representation of a decoder arrangement wherein video signals corresponding to a plurality of channels are extracted from a single video channel.

FIG. 11 is a block and line representation of a decoder system constructed in accordance with the invention. As shown, an R.F. signal, which may correspond, in certain embodiments of the invention with the modified analog signal, is conducted to a tuner and demodulator arrangement 160. Tuner and demodulator arrangement 160 converts the signal to baseband video which is conducted to analog-to-digital converter 161. Analog-to-digital converter 161 digitizes the signal which is then expanded by expanders 162 and 163. The expanded luminance signal and the expanded U-color and V-color signals are demultiplexed into three respective channels by a demultiplexer 164. The three demultiplexed channels, in this embodiment, correspond to the luminance and color components, Y, U, and V. These components are then combined into a composite signal using a conventional color encoder 165. A switch 174 controls demultiplexer 164, enabling it to select between the time slots allocated to channel A, and those allocated to channel B. The switch, therefore, selects the appropriate channel components which are conducted to encoder 165.

In the decoder, the components are expanded back to their original lengths. In its compressed state the bandwidth of the luminance component was reduced to 4.2 MHZ. When expanded by two, the luminance bandwidth becomes approximately half that, 2.1 MHz. Similarly the chroma bandwidth becomes approximately one-eighth of 4.2 MHZ, or 0.5 MHz. These are approximately the bandwidths associated with VHS recording equipment. In a practical implementation, the ratios of compression and expansion would be modified somewhat, to effect an optimum compromise between the luminance and chroma bandwidths. In addition, by using conventional analog and digital enhancement techniques, the rise times of the luminance and chroma channels is improved, resulting in sharpening of the video image. Such refinements can be effected by persons of ordinary skill in the art in light of the teachings of this disclosure.

Figure 12:
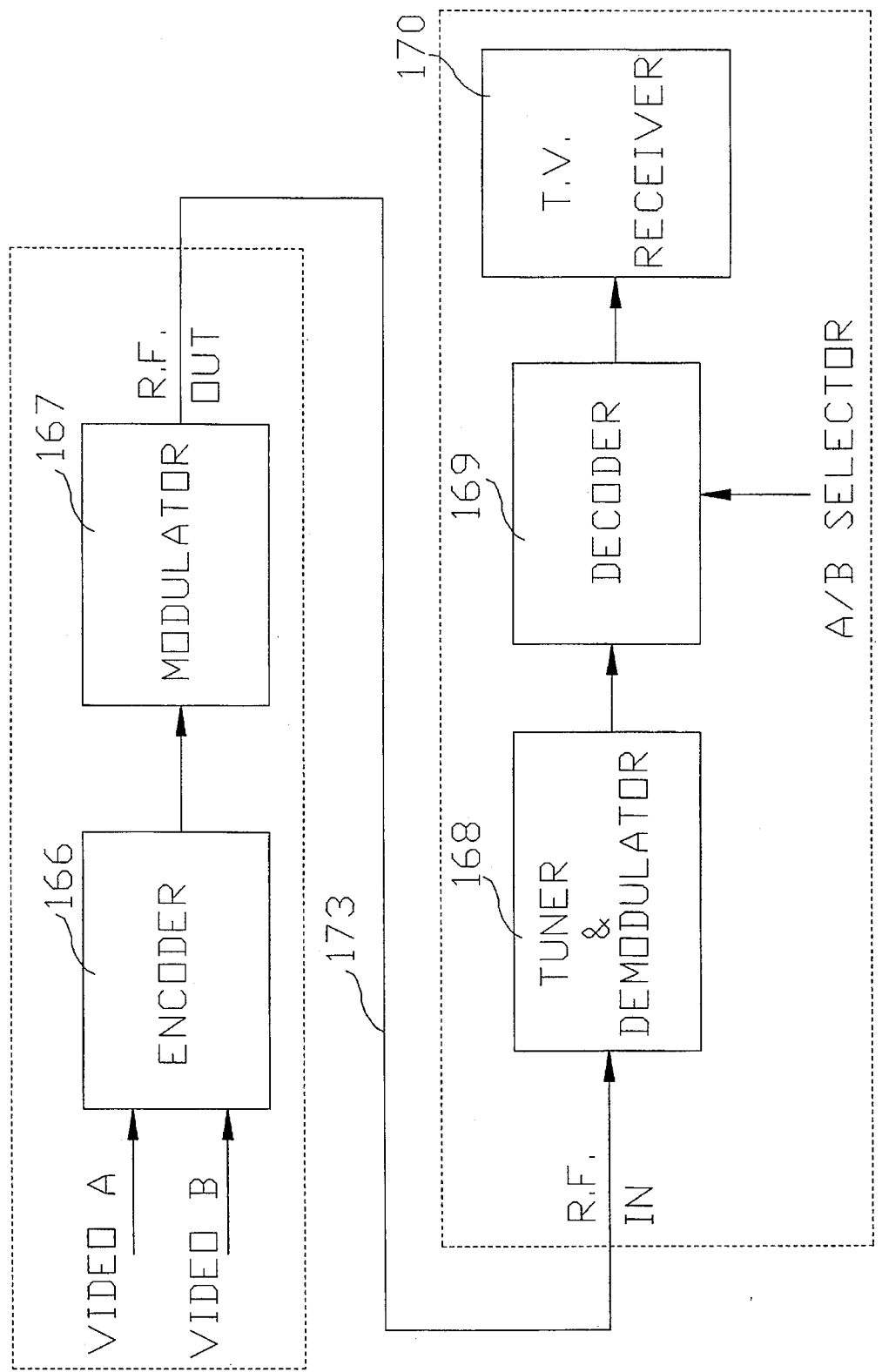
FIG. 12 is a function block representation of a general transmitting and receiving system constructed in accordance with principles of the invention.

FIG. 12 is a simplified block and line representation of an overall system constructed in accordance with the principles of the invention. An encoder 166 compresses the signals of video channels A and B, and supplies the compressed signals to a modulator 167. Modulator 167 produces at its output an R.F. signal which is conducted via a cable 173 to the input of a tuner and demodulator 168, located at the receiving end. Tuner and demodulator 168 issues a base band video signal to a decoder 169 which delivers components of the video signals to a T.V. receiver 170 in response to an selector switch. The selected signal is conducted to a base band input of T.V. receiver 170.

One of the important advantages of the present system is that scrambling can easily be achieved. One mode of achieving scrambling is to vary the sequence of the different time segments described above to other configurations. For example, instead of inserting two consecutive luminance lines from the same video channel into each 63.5 µs time segment, a single luminance line from channel A followed by a single luminance line from channel B followed by U-color and V-color component signals for channel A can be transmitted. Each of the 63.5 µs time segments would o contain chroma information from only one channel. The chroma information for the other channel would be transmitted in the next 63.5 µs time segment.

Another scramble sequence is achieved by transmitting the time segments whereby two luminance lines are followed by two chroma signals. In the alternative, a large number of luminance segments can be followed by a large number of chroma segments, etc. A large number of such scramble sequences is possible. To scramble the data, a set of predetermined configurations would be chosen and stored in the decoders. During the vertical interval, at the start of each field, decoders would be notified which sequence or configuration was to be used for that field, in a manner similar to that shown in U.S. Pat. No. 5,204,900, which issued to the inventor herein. With certain sequences, the delay between the modified analog signal and its sync may be greater than one line, that would be accommodated by changing the one line advance to a greater amount of advance.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of combining first and second video signals for transmission via a single video channel, each of said first and second video signals being of the type having a luminance component within each of a plurality of sequentially recurring horizontal line periods, the method comprising the steps of:

first separating a luminance component of the first video signal during a respective first horizontal line period;

second separating a luminance component of the second video signal during a respective first horizontal line period;

first time compressing the luminance component of the first video signal by a predetermined compression factor;

second time compressing the luminance component of the second video signal by a predetermined compression factor;

forming an output video signal having a plurality of sequential output horizontal line periods;

first inserting the time-compressed luminance component of the first video signal in a selected one of the output horizontal line periods;

second inserting the time-compressed luminance component of the second video signal in a selected one of the output horizontal line periods;

digitizing said luminance component of the first video signal to produce first digital data corresponding to said first video signal;

writing said first digital data in a first memory location;

digitizing said luminance component of the second video signal to produce second digital data corresponding to said second video signal;

writing said second digital data in a second memory location;

third separating a first chroma component of the first video signal during a respective first horizontal line period;

fourth separating a first chroma component of the second video signal during a respective first horizontal line period;

third time compressing the first chroma component of the first video signal by a predetermined compression factor;

fourth time compressing the first chroma component of the second video signal by a predetermined compression factor;

third inserting the time-compressed first chroma component of the first video signal in said selected one of the output horizontal line periods; and fourth inserting the time-compressed first chroma component of the second video signal in said selected one of the output horizontal line periods; wherein:

said step of third inserting is performed into a synchronization data portion of said selected one of the output horizontal line periods; and said step of fourth inserting is performed into a synchronization data portion of said selected one of the output horizontal line periods.

2. The method of claim 1 wherein the first horizontal line periods associated with the first and second video signals, are substantially simultaneous with one another.

3. The method of claim 1 wherein said step of first time compressing comprises the further step of reading said first digital data frame said first memory.

4. The method of claim 1 wherein said step of second time compressing comprises the further step of reading said second digital data from said second memory.

5. The method of claim 1 wherein:

said predetermined compression factor employed in said step of third time compressing is greater than said predetermined compression factor employed in said step of first time compressing; and said predetermined compression factor employed in said step of fourth time compressing is greater than said predetermined compression factor employed in said step of second time compressing.

6. The method of claim 1 wherein there are provided the further steps of:

selecting said predetermined compression factors so as to provide a time interval in selected ones of said recurring horizontal line periods; and inserting a chroma clamp pulse in said time interval in a first one of said selected ones of said recurring horizontal line periods.

7. The method of claim 6 wherein there is provided the further step of inserting a sync pulse in said time interval in a second one of said selected ones of said recurring horizontal line periods.

8. The method of claim 7 wherein said steps of inserting a chroma clamp pulse and inserting a sync pulse are performed alternatingly in said time intervals of alternating ones of said selected ones of said recurring horizontal line periods.

9. The method of claim 1 wherein said steps of first inserting and second inserting are performed in respective output horizontal line periods which are selected in accordance with a predetermined scramble pattern.

10. The method of claim 9 wherein descrambling data responsive to said predetermined scramble pattern is incorporated into said output video signal.

11. The method of claim 1 wherein each of said output horizontal line periods is arranged to have first and second luminance intervals and respectively associated first and second subintervals, said step of first inserting is performed in said first luminance interval of said selected output horizontal line period, and said step of second inserting is performed in said first luminance interval of an output horizontal line period which is immediately subsequent to said output horizontal line period selected in said step of first inserting.

12. The method of claim 11 wherein said first and second video signals are color video signals, and each has associated therewith respective first and second chroma components, there being further provided the steps of:

first chroma compressing said first chroma component of said first video signal; and second chroma compressing said second chroma component of said first video signal.

13. The method of claim 12 wherein there are further provided the steps of:

inserting said compressed first chroma component of said first video signal into said first subinterval of said selected output horizontal line period; and inserting said compressed second chroma component of said first video signal into said second subinterval of said selected output horizontal line period.

14. The method of claim 11 wherein each of said output horizontal line periods has a duration which corresponds substantially to the duration of a horizontal line period of said first video signal.

15. A method of decoding a source video signal to produce a plurality of video channels therefrom, the method comprising the step of forming a first video channel signal having a plurality of sequential horizontal intervals, said step of forming comprising the steps of:

extracting from the source video signal a first luminance component signal related to a first one of the plurality of video channels;

inserting said first luminance component signal in a first one of said horizontal intervals of said first video channel;

extracting from the source video signal a second luminance component signal related to the first video channel;

inserting said second luminance component signal in a second one of said horizontal intervals of said first video channel;

extracting from the source video signal a first chroma component signal related to the first one of the plurality of video channels;

inserting said first chroma component signal in said first one of said horizontal intervals of said first video channel; and inserting said first chroma component signal in said second one of said horizontal intervals of said first video channel, whereby said first chroma component signal is repeated in said second one of said horizontal intervals.

16. The method of claim 15 wherein there is provided the further step of forming a second video channel signal having a plurality of sequential horizontal intervals, said further step of forming comprising the steps of:

extracting from the source video signal a first luminance component signal related to a second one of the plurality of video channels;

inserting said first luminance component signal in a first one of said horizontal intervals of said second video channel:

extracting from the source video signal a second luminance component signal related to the second video channel;

inserting said second luminance component signal in a second one of said horizontal intervals of said second video channel;

extracting from the source video signal a first chroma component signal related to the second one of the plurality of video channels;

inserting said first chroma component signal in said first one of said horizontal intervals of said second video channel; and inserting said first chroma i component signal in said second one of said horizontal intervals of said second video channel, whereby said first chroma component signal is repeated in said second one of said horizontal intervals.

17. An encoding system for combining a plurality of video source channels to form an output video channel for transmission, the encoding system comprising:

first and second decoder means, each having a video input for receiving a respectively associated input video signal corresponding to one of the video source channels, for separating said input video signal into respective luminance and chroma signals at respective luminance and chroma outputs, said luminance signal comprising luminance information corresponding to respective horizontal periods, and said chroma comprising chroma information associated with luminance information corresponding to a respectively associated predetermined horizontal period, said chroma information being repeated over a subsequent horizontal period;

compressor means for compressing in time said luminance and chroma signals, said compressor means being further provided with;
a first compressor coupled to said first decoder means for compressing in time said luminance signal issued by said first decoder means;
a second compressor coupled to said second decoder means for compressing in time said luminance signal issued by said second decoder means;
a third compressor coupled to said first decoder means for compressing in time said chroma signal issued by said first decoder means; and
a fourth compressor coupled to said second decoder means for compressing in time said chroma signal issued by said second decoder means; and multiplexer means coupled to said compressor means for selecting alternately between said first and second decoder means.

18. The encoding system of claim 17 wherein said first and second compressors compress said luminance signals issued by said first and second decoder means by a factor of approximately two (2).

19. The encoding system of claim 18 wherein said first and second compressors each comprise:

analog-to-digital converter means having an input for receiving a respectively associated one of said input video signals, and an output for issuing corresponding digital data;

memory means for receiving said corresponding digital data from said analog-to-digital converter;

first clock pulse source means having a first determined frequency characteristic coupled to said analog-to-digital converter and said memory means for determining a rate at which said corresponding digital data from said analog-to-digital converter is entered into said memory means;

digital-to-analog converter means having an input for receiving said corresponding digital data from said memory means; and second clock pulse source means having a second determined frequency characteristic coupled to said memory means and said digital-to-analog converter means for determining a rate at which said corresponding digital data from said memory means is entered into said digital-to-analog converter means.

20. The encoding system of claim 19 wherein said first and second determined frequency characteristics have a relative frequency relationship of approximately 1:2.

21. The encoding system of claim 17 wherein said third and fourth compressors compress said chroma signals issued by said first and second decoder means by a factor of approximately eight (8).

22. A method of scrambling first and second video signals for transmission via a single video channel, each of said first and second video signals being of the type having a luminance component within each of a plurality of sequentially recurring horizontal line periods, the method comprising the steps of:

first separating a luminance component of the first video signal during a respective first horizontal line period;

second separating a luminance component of the second video signal during a respective first horizontal line period;

first time compressing the luminance component of the first video signal by a predetermined compression factor;

second time compressing the luminance component of the second video signal by a predetermined compression factor;

forming an output video signal having a plurality of sequential output horizontal line periods;

determining a predetermined scrambling pattern related to said sequential output horizontal line periods;

first inserting the time-compressed luminance component of the first video signal in a one of the output horizontal line periods selected in response to said predetermined scrambling pattern; and second inserting the time-compressed luminance component of the second video signal in a one of the output horizontal line periods selected in response to said predetermined scrambling pattern.

23. The method of claim 22 wherein there is further provided the step of incorporating in said output video signal data corresponding to said predetermined scrambling pattern, whereby the location of said luminance components in said output horizontal line periods is determined.

24. The method of claim 22 wherein said step of determining a predetermined scrambling pattern includes the further step of dividing said sequential output horizontal line periods into respective subperiods of said sequential output horizontal line periods, and there are provided the further steps of:

determining a predetermined subperiod scrambling pattern; and incorporating in said output video signal data corresponding to said predetermined subperiod scrambling pattern, whereby the location of said luminance components in said subperiods of said output horizontal line periods is determined.

25. A method of decoding a source video signal to produce a plurality of video channels therefrom, the method comprising the steps of:

forming first and second video channel signals each having a respective plurality of sequential horizontal intervals, said step of forming further comprising the steps of:

extracting from the source video signal a first luminance component signal related to a first one of the plurality of video channels;

inserting said first luminance component signal in a first one of said horizontal intervals of said first video channel;

extracting from the source video signal a second luminance component signal related to the first video channel;

inserting said second luminance component signal in a second one of said horizontal intervals of said first video channel;

extracting from the source video signal a first luminance component signal related to a second one of the plurality of video channels;

inserting said first luminance component signal in a first one of said horizontal intervals of said second video channel;

extracting from the source video signal a second luminance component signal related to the second video channel; and inserting said second luminance component signal in a second one of said horizontal intervals of said second video channel; and adding chroma information to said first video channel, said step of adding chroma information comprising the steps of:

extracting from the source video signal a first chroma component signal related to said first one of the plurality of video channels;

inserting said first chroma component signal in said first one of said horizontal intervals of said first video channel;

interpolating said first chroma component signal with a further chroma component signal associated with said first one of the plurality of video channels to form an interpolated chroma component signal; and inserting said interpolated chroma component signal in said second one of said horizontal intervals of said first video channel.

\* \* \* \* \*